(12) United States Patent
Timmins et al.

(10) Patent No.: US 7,546,323 B1
(45) Date of Patent: Jun. 9, 2009

(54) SYSTEM AND METHODS FOR MANAGING BACKUP STATUS REPORTS

(75) Inventors: Paul J. Timmins, Natick, MA (US); Xiaosu Wu, Westborough, MA (US); Karl Martin Connolly, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 241 days.

(21) Appl. No.: 10/954,991

(22) Filed: Sep. 30, 2004

(51) Int. Cl.
G06F 12/00 (2006.01)
G06F 17/30 (2006.01)
G06F 7/00 (2006.01)
G06F 13/00 (2006.01)

(52) U.S. Cl. .............................. 707/204; 707/1; 707/10; 707/100; 707/101; 707/200; 711/161; 711/162

(58) Field of Classification Search ............. 707/1–206; 705/80, 400, 500; 711/100; 706/45; 700/1
See application file for complete search history.

(56) References Cited

U.S. PATENT DOCUMENTS

| | | | | | |
|---|---|---|---|---|---|
| 5,295,230 | A | * | 3/1994 | Kung | 706/59 |
| 5,495,607 | A | * | 2/1996 | Pisello et al. | 707/10 |
| 5,504,921 | A | * | 4/1996 | Dev et al. | 709/223 |
| 5,606,693 | A | * | 2/1997 | Nilsen et al. | 707/10 |
| 5,649,196 | A | * | 7/1997 | Woodhill et al. | 707/204 |
| 5,668,986 | A | * | 9/1997 | Nilsen et al. | 707/10 |
| 5,678,042 | A | * | 10/1997 | Pisello et al. | 714/47 |
| 5,777,874 | A | * | 7/1998 | Flood et al. | 700/82 |
| 6,151,688 | A | * | 11/2000 | Wipfel et al. | 714/48 |
| 6,209,023 | B1 | * | 3/2001 | Dimitroff et al. | 709/211 |
| 6,223,262 | B1 | * | 4/2001 | Cadden et al. | 711/154 |
| 6,338,112 | B1 | * | 1/2002 | Wipfel et al. | 710/269 |
| 6,353,898 | B1 | * | 3/2002 | Wipfel et al. | 714/48 |
| 6,442,551 | B1 | * | 8/2002 | Ofek | 707/10 |
| 6,460,054 | B1 | * | 10/2002 | Grummon | 707/204 |
| 6,654,752 | B2 | * | 11/2003 | Ofek | 707/10 |
| 6,678,698 | B2 | * | 1/2004 | Fredell et al. | 707/104.1 |
| 6,745,210 | B1 | * | 6/2004 | Scanlan et al. | 707/204 |
| 7,024,581 | B1 | * | 4/2006 | Wang et al. | 714/2 |
| 2003/0101166 | A1 | * | 5/2003 | Uchino et al. | 707/2 |
| 2003/0167273 | A1 | * | 9/2003 | Alexander et al. | 707/100 |
| 2004/0139128 | A1 | * | 7/2004 | Becker et al. | 707/204 |
| 2004/0230597 | A1 | * | 11/2004 | Wookey | 707/101 |
| 2005/0021359 | A1 | * | 1/2005 | McKinney | 705/1 |
| 2005/0108484 | A1 | * | 5/2005 | Park | 711/162 |

* cited by examiner

Primary Examiner—Hung Q Pham
Assistant Examiner—Hubert Cheung
(74) Attorney, Agent, or Firm—Chapin IP Law, LLC; Barry W. Chapin, Esq.

(57) ABSTRACT

A storage area network uniform integrated backup reporting and verification mechanism displays backup reporting information at an enterprise level while showing uniformity among heterogeneous backup applications of different vendors. The backup management application coalesces data from different backup applications by scanning status data from backup applications, and identifying data corresponding to common output fields. Further storage array specific aspects, information, or commands are attainable via the linkages to the native backup applications specific to the individual storage arrays. The backup management application provides uniform reporting and verification of satisfactory backup completion across the SAN, or otherwise pinpoints and clarifies problems or other anomalies associated with the backup. Further, filtering and focused report layouts allow customization and refinement of the output data providing a multitude of integrated report formats to facilitate operations including troubleshooting, charge back and service provisioning.

2 Claims, 11 Drawing Sheets

Backup Clients - Basic
Jun 21, 2004 4:10 AM

| Site Name | Backup Server Host | # Configuration Items | Client Host Name | # Data Sets |
|---|---|---|---|---|
| Master | LOSBD167 | 1 | l82al206 | 5 |
| Master | LOSBD167 | 1 | bsbd201 | 3 |
| Master | LOSBD167 | 1 | bsbd097 | 5 |
| Master | LOSBD167 | 2 | bsbd050 | 6 |
| Master | LOSBD167 | 1 | usenmfriedmax1l | 5 |
| Master | LOSBD167 | 1 | bsbd096 | 4 |
| Master | LOSBD167 | 2 | bsbd167 | 5 |
| Master | LOSBD167 | 1 | l82al208 | 1 |
| Master | LOSBD167 | 2 | bsbd052 | 7 |
| Master | LOSBD167 | 1 | bsbd177 | 3 |
| Master | LOSBD167 | 1 | bsbd203 | 5 |
| Master | LOSBD167 | 1 | bsbd204 | 1 |
| Master | LOSBD167 | 1 | z4617a | 1 |
| Master | LOSBD167 | 1 | ssemad.csent.com | 1 |

| Backup Schedule - Basic | | | | | | Jun 21, 2004 4:10 AM | |
|---|---|---|---|---|---|---|---|
| Site Name | Backup Server Host | Configuration Item Name | Schedule Name | Client Host Name | Data Set Name | Start Time (GMT) | |
| Master | LOSBD167 | ECC | ECC:Full Every Friday | losbd203 | /install | | |
| Master | LOSBD167 | ECC | ECC:Full Every Friday | losbd203 | /s2fs1 | | |
| Master | LOSBD167 | ECC | ECC:Full Every Friday | losbd203 | /s3fs1 | | |
| Master | LOSBD167 | ECC | ECC:Full Every Friday | losbd203 | All | | |
| Master | LOSBD167 | ECC | ECC:Full Every Friday | losbd204 | All | | |
| Master | LOSBD167 | ECC | ECC:Full Every Friday | losbd177 | All | | |
| Master | LOSBD167 | ECC | ECC:Full Every Friday | losbd177 | /install | | |
| Master | LOSBD167 | ECC | ECC:Full Every Friday | l82st206 | /install | | |
| Master | LOSBD167 | ECC | ECC:Full Every Friday | l82at206 | /s3fs1 | | |
| Master | LOSBD167 | ECC | ECC:Full Every Friday | l82at206 | /s2fs1 | | |
| Master | LOSBD167 | ECC | ECC:Full Every Friday | l82at206 | All | | |
| Master | LOSBD167 | ECC | ECC:Full Every Friday | losbd201 | All | | |

| Backup Data Sets - Basic | | | | | Jun 21, 2004 4:10 AM |
|---|---|---|---|---|---|
| Site Name | Backup Server Host | Configuration Item Name | Client Host Name | Data Set Name | |
| Master | LOSBD167 | ECC | losbd203 | / | |
| Master | LOSBD167 | ECC | losbd203 | /install | |
| Master | LOSBD167 | ECC | losbd203 | /s2fs1 | |
| Master | LOSBD167 | ECC | losbd203 | /s3fs1 | |
| Master | LOSBD167 | ECC | losbd203 | All | |
| Master | LOSBD167 | ECC | losbd204 | All | |
| Master | LOSBD167 | ECC | losbd177 | / | |
| Master | LOSBD167 | ECC | losbd177 | /install | |
| Master | LOSBD167 | ECC | l82a206 | / | |
| Master | LOSBD167 | ECC | l82a206 | /install | |
| Master | LOSBD167 | ECC | l82a206 | /s3fs1 | |
| Master | LOSBD167 | ECC | l82a206 | All | |
| Master | LOSBD167 | ECC | losbd201 | / | |
| Master | LOSBD167 | ECC | losbd201 | /install | |
| Master | LOSBD167 | NDMP | losbd097 | All | |
| Master | LOSBD167 | NDMP | losbd097 | /s2fs1 | |
| Master | LOSBD167 | NDMP | losbd097 | /s3fs1 | |
| Master | LOSBD167 | Windows | l82a208 | All | |
| Master | LOSBD167 | Oracle | losbd050 | /fs_1/oracle/v/isdb9.2.0/backup_script | |
| Master | LOSBD167 | Default | losbd050 | /fs_1/oracle/v/isdb9.2.0/backup_script | |

Fig. 10

| Report Site | | Report Date Jun 21, 2004 | Time 4:10 AM | Layout Basic |

Host Configuration - General - Basic (LOSBD167)

| General | Groups | HBAs | Storage Arrays | File Systems | Databases | Volume Groups | Logical Volumes | Devices |

| | |
|---|---|
| ▪ Site Name: | Master |
| ▪ Host: | LOSBD167 |
| ▪ Host Model: | sun4u |
| ▪ Primary IP Address: | 172.23.141.167 |
| ▪ Operating System: | Solaris 2.8 |
| ▪ Operating System Version: | 2.8 |
| ▪ Operating System Release: | 2.8 |
| ▪ Operating System Level: | Generic_108528-11 |
| ▪ # Host Devices: | 28 |
| ▪ PowerPath - # Devices: | 0 |
| ▪ PowerPath - # Physical Paths: | 0 |
| ▪ # File Systems: | 7 |
| ▪ # Databases: | 0 |
| ▪ # Volume Groups: | 0 |
| ▪ # Logical Volumes: | 0 |
| ▪ Installed Memory (MB): | 1,024 |
| ▪ # Accessible Devices: | 13 — 114' |
| ▪ # Allocated Devices: | 12 |

SYSTEM AND METHODS FOR MANAGING BACKUP STATUS REPORTS

BACKGROUND OF THE INVENTION

Conventional managed information environments, such as a Storage Area Network (SAN), typically employ an interconnection of storage arrays operable for storing large quantities of data, in which the storage arrays are responsive to a management application such as an SNMP (Simple Network Management Protocol) based application. The SAN includes a plurality of host computers coupled to users for storage and retrieval of the data in the storage array devices. The SAN, therefore, supports an enterprise such as a corporation or business entity with conventional information storage and retrieval services via the SAN. The SAN management application allows administration activities, such as monitoring and maintenance of the storage arrays, for ensuring maximum throughput and efficiency of the data to and from users via the SAN.

In a conventional storage area network, periodic backups of data to a reliable long term storage medium remain a desirable, if not mandatory, aspect of SAN maintenance. Such backups allow retrieval and recreation of SAN entrusted data in the event of human error, such as accidental deletions, hardware failure, such as individual disk drive failure, and catastrophic events such as fire, natural disaster, or other site wide neutralizing scenario. Accordingly, regular backup operations and verification of adequate completion thereof are an integral component of SAN hygiene.

Frequently, conventional backup operations are provided by or facilitated by a vendor supplied backup application specific to each type and vendor of storage arrays. Often, however, a customer site maintains a heterogeneous combination of such storage arrays. Accordingly, SAN backup tends to evolve into a repertoire of backup applications, executed according to a predetermined schedule adapted for enabling subsequent recovery of the data stored thereby. Further, such backup operations typically alternate between incremental and full backups, as a means of optimizing backup duration, utilization of backup media volume, and performance intrusions, while nonetheless enabling timely retrieval when called for. Therefore, management of backup operations in a large, heterogeneous network of storage arrays is a formidable task.

A conventional SAN, therefore, employs a plurality of hosts, each connected to one or more storage arrays. The storage arrays each include a plurality of individual storage array devices, also known as storage units, disk drives or spindles, operating as an integrated storage medium. In a configured SAN, each of the storage arrays may have different numbers, types, and arrangements of the storage units, and are often from multiple vendors. Further, the storage within a storage array may be partitioned or designated according to data redundancy or protection schemes, such as shadowing, journaling, and RAID arrangements, and may also be partitioned for usage by certain subsets of users. Accordingly, tracking consumption of available storage and identifying areas of excessive or sparse consumption becomes a formidable task.

SUMMARY

In a storage area network, backup resources typically include different applications from different vendors. Accordingly, SAN operators employ multiple backup operations and must therefore assimilate the corresponding status reports. Often, the backup status reports are distributed depending on the operation of the individual, vendor specific backup application, and also on the type of storage array being backed up. SAN system operators or managers typically correlate multiple status reports to attempt to synthesize an overall indication of backup sufficiency, and to pinpoint operational problems or inconsistencies. Such correlation is typically manual inspection and observation of conventional backup status reports, such as text file output, and reading or searching for error codes and/or successful completion indicators. Accordingly, conventional backup status verification confirmation is a cumbersome brute-force analysis, which tends to be prone to oversights and misinterpretation resulting in varying and possibly suspect levels of validation and verification of sufficient backup activities.

Configurations of the invention substantially overcome the shortcomings associated with conventional backup status gathering and reporting by performing an integration of backup status reports to provide a uniform presentation of status from among multiple heterogeneous backup applications. Each of the backup applications typically corresponds to a particular vendor and/or type of storage array. Such conventional backup applications are accessible via a vendor supplied application programming interface (API). The backup management application discussed further below is operable with each of the APIs of the target backup applications, and gathers raw backup data in a set of backup data files, such as Extensible Markup Language (XML) files. The backup management application coalesces the raw backup data, such as via a markup language parser or other processing, to generate an integrated report of overall backup status. The integrated backup status is adaptable for display via a graphical user interface (GUI) on an operator console, and includes hyperlinks back to the source backup applications for pinpointed clarification and refinement of the status reporting in a drill-down manner.

The integrated backup data gathering, coalescing, and interactive GUI reporting includes normalizing the raw backup status data from each of a plurality of individual vendor specific backup applications. In the exemplary configuration, the raw backup data is gathered as a set of six backup data collections pertaining to the backup server, client, data sets, job errors, job details, job errors and schedule. The backup management application identifies and extracts the raw data corresponding to each of the backup data collections. The backup management application identifies the various status information according to common denominators of backup status, and normalizes differences by interpreting data items such as error codes and status messages uniformly. The backup management application, therefore, stores the normalized raw data in the markup form operable for subsequent processing including processing the raw data and linking to the source applications, therefore providing an enterprise view of the overall backup and providing uniformity across backup vendors, enabling backup verification and validation to ensure compliance with applicable requirements, such as coverage, recovery times, and other quality of service (QOS) criteria.

Accordingly, configurations discussed herein provide a uniform integrated backup reporting and verification mechanism which displays backup reporting information at an enterprise level while showing uniformity among backup applications of different vendors. Further storage array specific aspects, information, or commands are attainable via the linkages to the native backup applications specific to the individual storage arrays. Therefore, in the exemplary configuration operative in conjunction with a SAN management application, the backup management application provides uniform reporting and verification of satisfactory backup completion across the SAN, or otherwise pinpoints and clarifies problems or other anomalies associated with the backup. Further, filtering and focused report layouts allow customization and refinement of the output data providing a multitude of integrated report formats to facilitate operations including troubleshooting, charge back and service provisioning.

In further detail, the method of reporting backup operational status in the storage area network includes gathering status information from a plurality of heterogeneous backup applications on one or more backup servers into a common repository, and receiving a layout indicative of requested status reports from a user or operator requesting the backup report. The backup management application scans the common repository for status data corresponding to requested status reports, and coalesces the scanned data to identify the requested status information, in which coalescing includes identifying corresponding status fields from different backup applications. The backup management application then generates a backup status report indicative of the coalesced data from each of the status fields in the layout to provide an integrated report covering each of the dissimilar backup applications performing the backup, however in a normalized form which identifies common fields and groups accordingly.

The backup management application employs a responsive API for interrogating each of the plurality of backup applications, in which each of the backup applications is independent of the other backup applications. Each of the backup applications corresponds to one of a plurality of different venders, and each of the vendors employs a set of status parameters independent of the status parameters corresponding to other vendors. The backup management application retrieving backup status parameters from each of the respective vendor specific APIs, in which the backup status parameters include the requested status information. In a particular configuration, the backup status parameters further comprise a plurality of sets of backup data, in which each of the sets includes backup status parameters corresponding to a particular report, the reports further including at least one of server data, client data, data sets, job errors, job details and schedule.

The backup management application coalesces the backup data of the different backup applications by scanning data corresponding to the plurality of data gathering applications, and identifying data corresponding to output fields in the received layout. The backup management application then determines corresponding status information in the repository for each of the output fields from each of the data gathering applications. Further, identifying data may further include filtering based on a user based filter selection, in which the layout is indicative of the filter selection, and the filtering is operable to selectively include a subset of available fields.

In particular configurations, the backup management application distinguishes status indicative of substandard performance, and identifies the particular vendor type of the application generating the substandard performance. The application maps the status to a diagnostic explanation of the cause of the substandard performance, displays the mapped diagnostic explanation to a user.

In alternate arrangements, the backup management application employs the GUI for establishing a link from the report display to the corresponding backup server. The GUI receives a user request for additional information related to the report display, and the backup management application traverses the link to the corresponding backup server for further in-depth query and analysis by a user or operator.

The backup management application, in further configurations, is adaptable for administrative tasks and accounting, such as quality of service and usage projections. The backup management application correlates the coalesced data with quality of service quantums, and comparing the correlated data with QOS data indicative of sufficient backup coverage according to predetermined QOS terms. The backup management application determines from the comparison if sufficient coverage of backup data and corresponding restoring ability exists. Further, the backup management application is operable to extrapolate backup data corresponding to a particular manageable entity, and project exhaustion of current capacity of the manageable entity for facilitating future acquisitions, for example.

The invention as disclosed above is described as implemented on a computer having a processor, memory, and interface operable for performing the steps and methods as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that, when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 8 shows an exemplary report of backup clients;

FIG. 9 shows an exemplary report of a backup schedule;

FIG. 10 shows an exemplary report of backup data sets; and

FIG. 11 shows an exemplary display of a link to a host.

DETAILED DESCRIPTION

In a large storage area network, backup resources typically include different applications from different vendors.

Accordingly, SAN operators employ multiple backup operations and must therefore assimilate the corresponding status reports. Often, the backup status reports are distributed depending on the operation of the individual, vendor specific backup application, and also on the type of storage array being backed up. SAN system operators or managers typically correlate multiple status reports to attempt to synthesize an overall indication of backup sufficiency, and to pinpoint operational problems or inconsistencies. Such correlation is typically manual inspection and observation of conventional backup status reports, such as text file output, and reading or searching for error codes and/or successful completion indicators. Accordingly, conventional backup status verification confirmation is a cumbersome brute-force analysis, which tends to be prone to oversights and misinterpretation resulting in varying and possibly suspect levels of validation and verification of sufficient backup activities.

Configurations discussed herein perform an integration of backup status reports to provide a uniform presentation of overall backup status reports from among multiple heterogeneous backup applications. Each of the backup applications typically corresponds to a particular vendor and/or type of storage array. Such conventional backup applications are accessible via a vendor supplied application programming interface (API). The backup management application is operable with each of the vendor specific APIs of the target backup applications, and gathers raw backup data in a set of backup data files, such as XML files. The backup management application coalesces the normalized raw backup data, such as via a markup language parser or other processing, to generate an integrated report of overall backup status. The integrated backup status is adaptable for display via a graphical user interface (GUI) on an operator console, and includes hyperlinks back to the source backup applications for pinpointed clarification and refinement of the status reporting in a drill-down manner.

Figure 1:
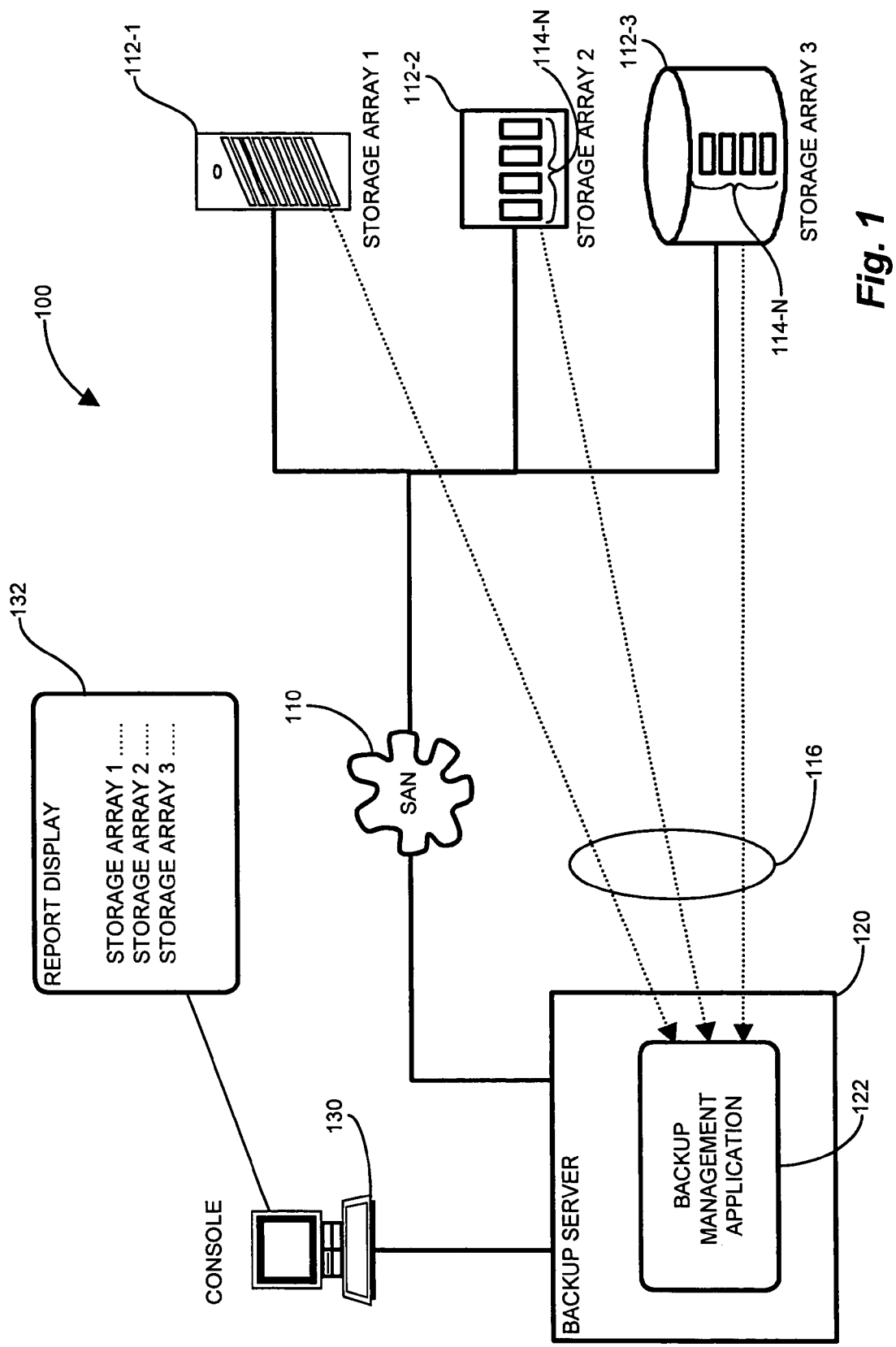
FIG. 1 is a context diagram of an exemplary managed information environment including a storage area network and suitable for use with configurations of the backup server.

FIG. 1 is a context diagram of an exemplary managed information environment 100 including a storage area network and suitable for use with configurations of the backup server. Referring to FIG. 1, a managed information environment 100 includes a storage area network 110 interconnecting a backup server 120 with a plurality of storage arrays 112-1 . . . 112-3, (112, generally) in an exemplary configuration. Each of the storage arrays 112 further includes a plurality of storage array devices 114-N, such as disk drives or spindles, which vary in configuration from vendor to vendor. The storage area network 110 (SAN) is operable to interconnect a plurality of manageable entities (not specifically shown) in the SAN, including connectivity devices, such as switches and routers and host computers, in addition to the storage arrays 112. The backup server 120, which may be part of a larger SAN management configuration, includes a backup management application 122, in communication with the various storage arrays 112 via the SAN 110.

The backup management server 120 is coupled to and responsive to a console 130 for receiving commands and displaying output reports on a report display 132. The storage arrays 112, each including a number of storage array devices such as disk drives 114, are typically a heterogeneous collection from a plurality of vendors. The backup management application 122 is operable to interrogate the different types of storage arrays 112-1 . . . 112-3 and coalesce and synthesize raw backup data 116 from the plurality of different storage array types. The backup management application 122 then presents the coalesced report in an integrated form on the report display 132 via the attached console 130.

Figure 2:
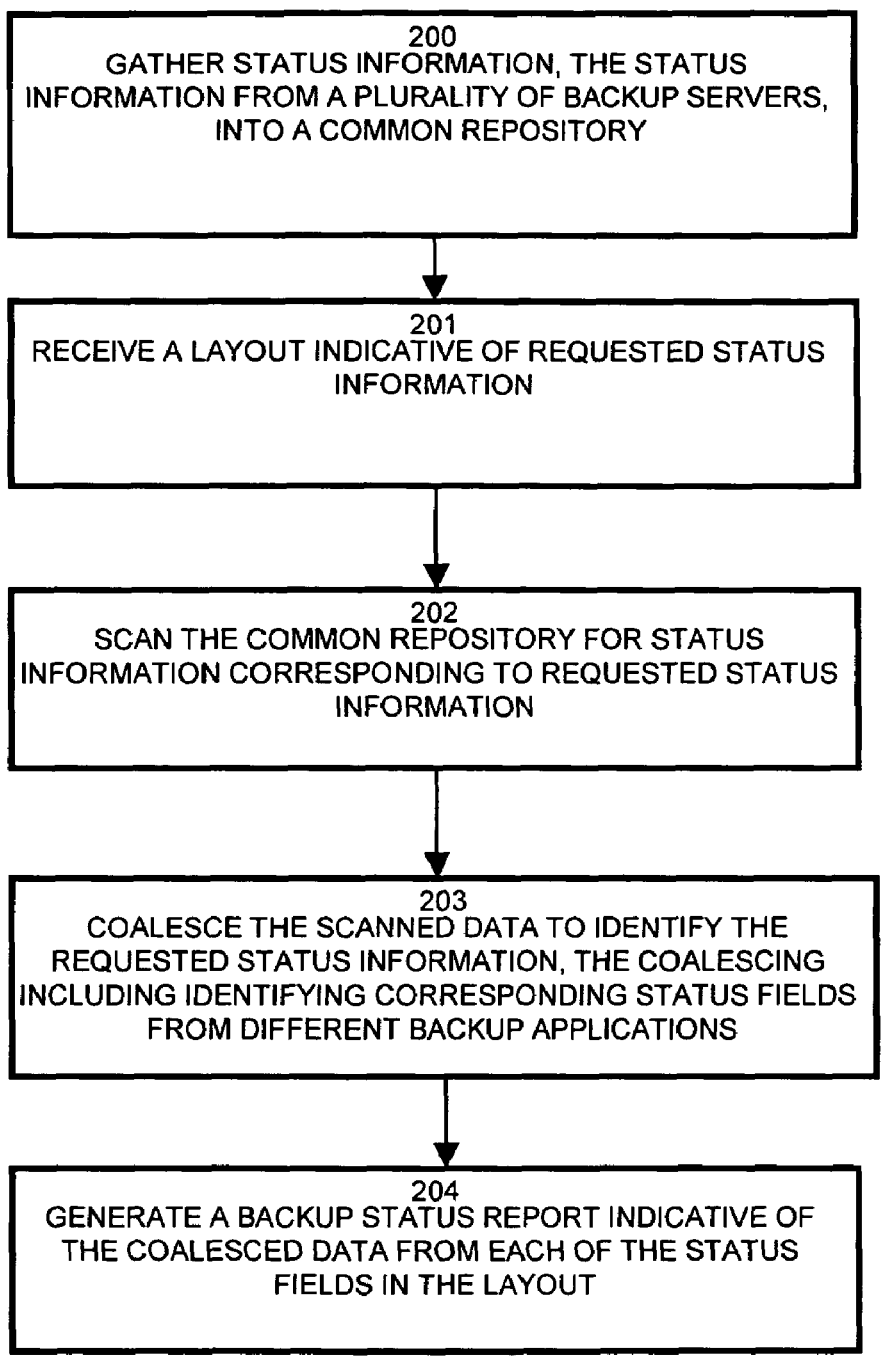
FIG. 2 is a flowchart illustrating backup reporting on the backup server of FIG. 1.
Figure 3:
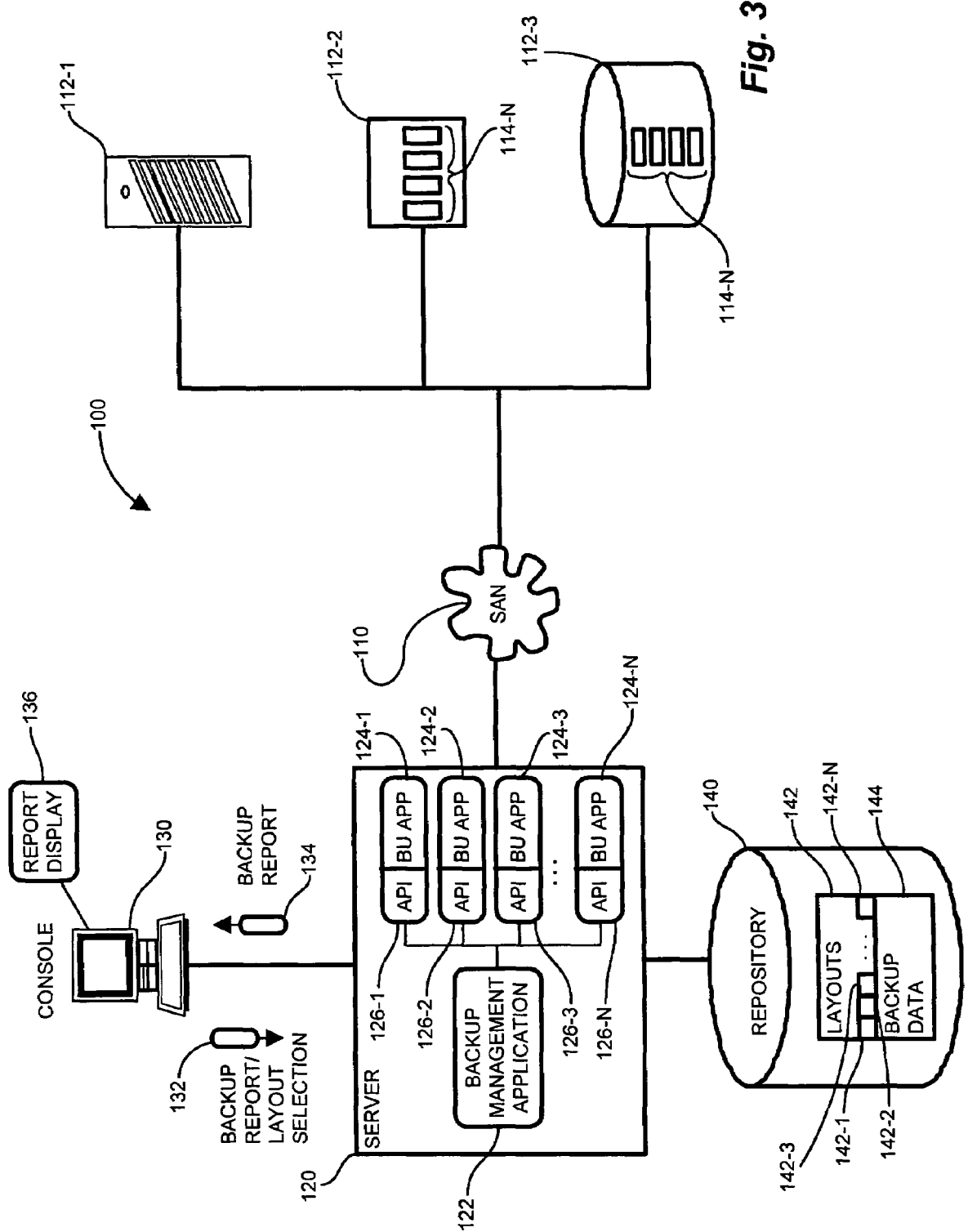
FIG. 3 shows the backup server of FIG. 1 in greater detail.
Figure 4:
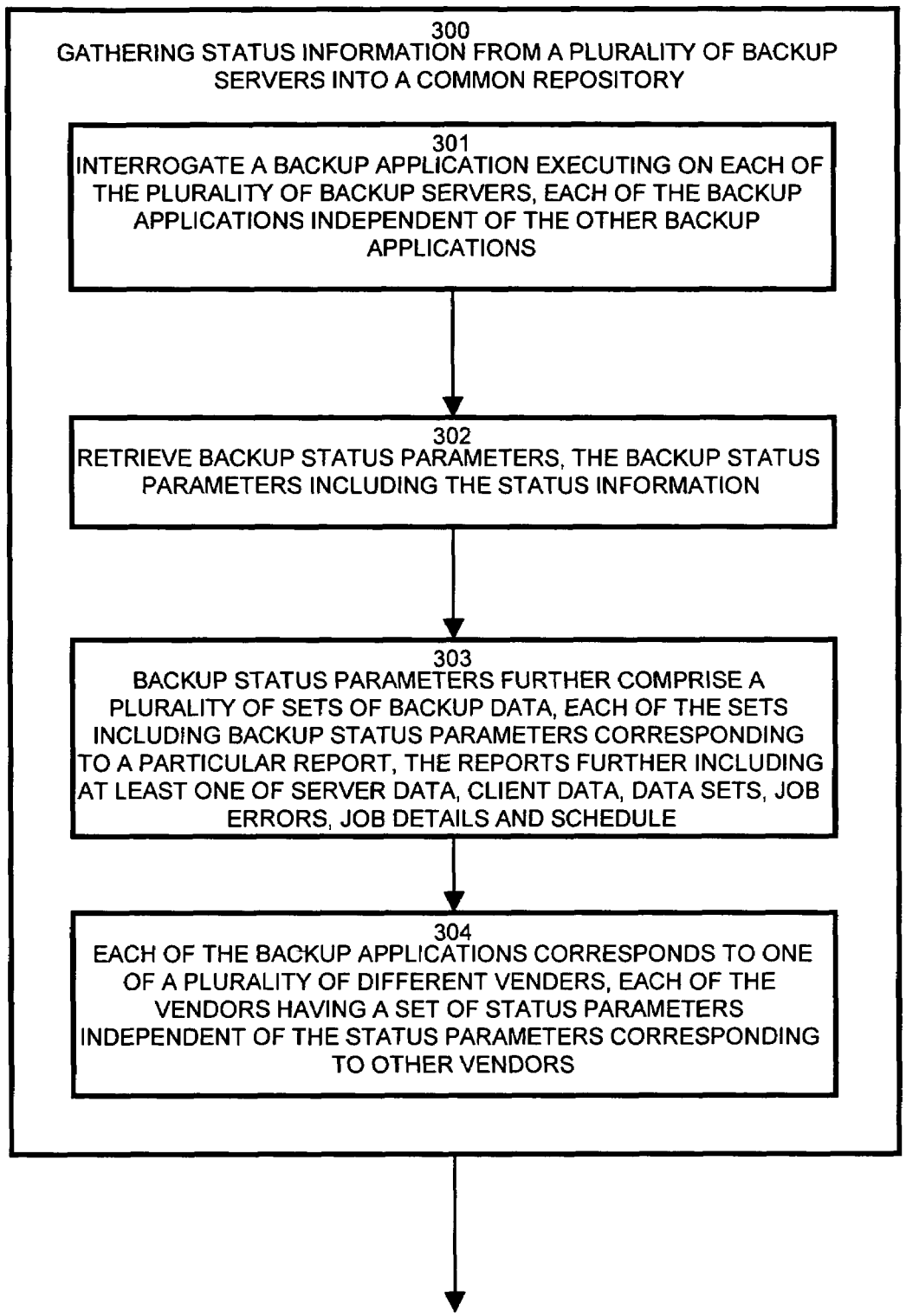
FIGS. 4-7 are a flowchart of backup server processing as in FIG. 2 in greater detail.
Figure 5:
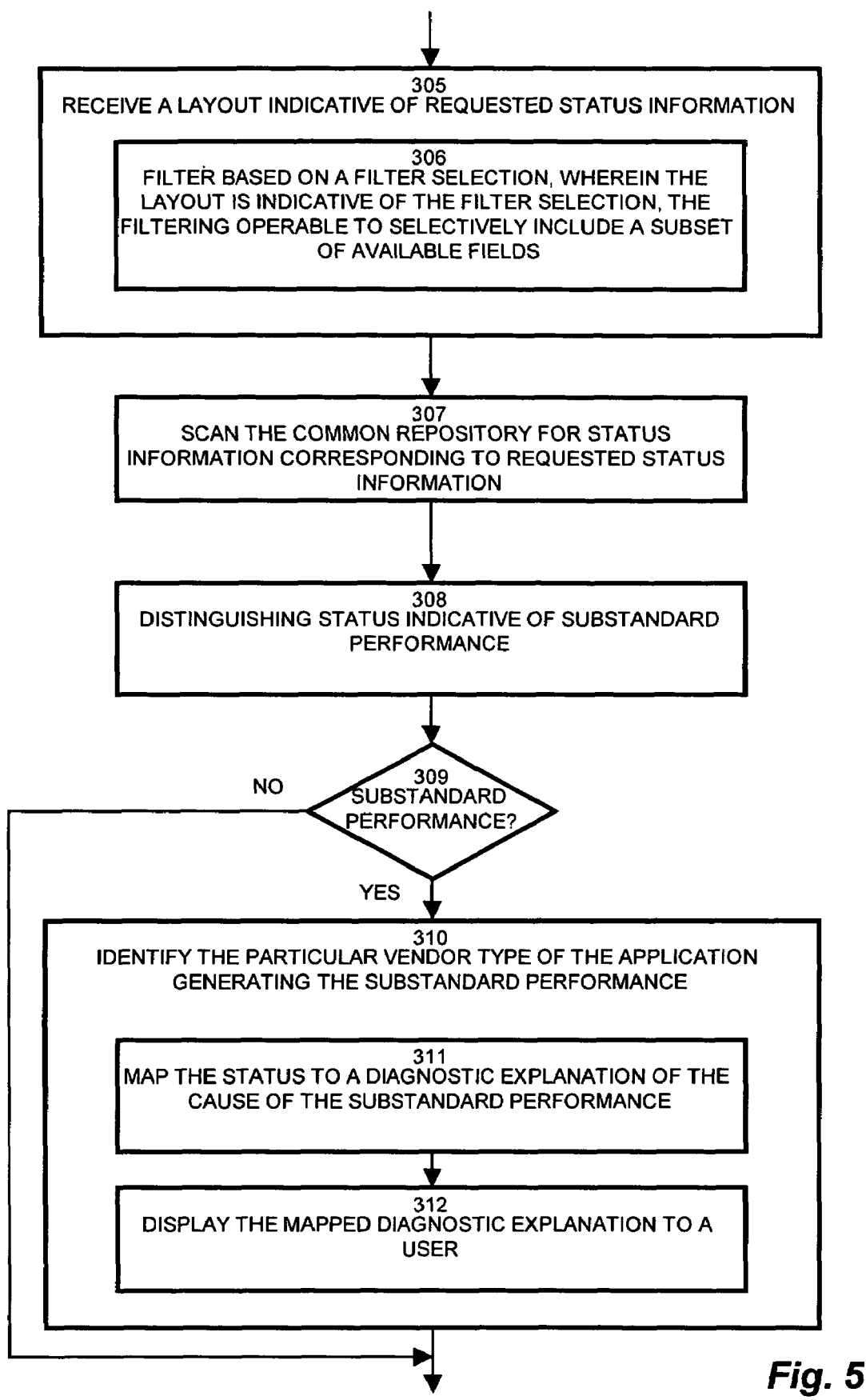
Figure 6:
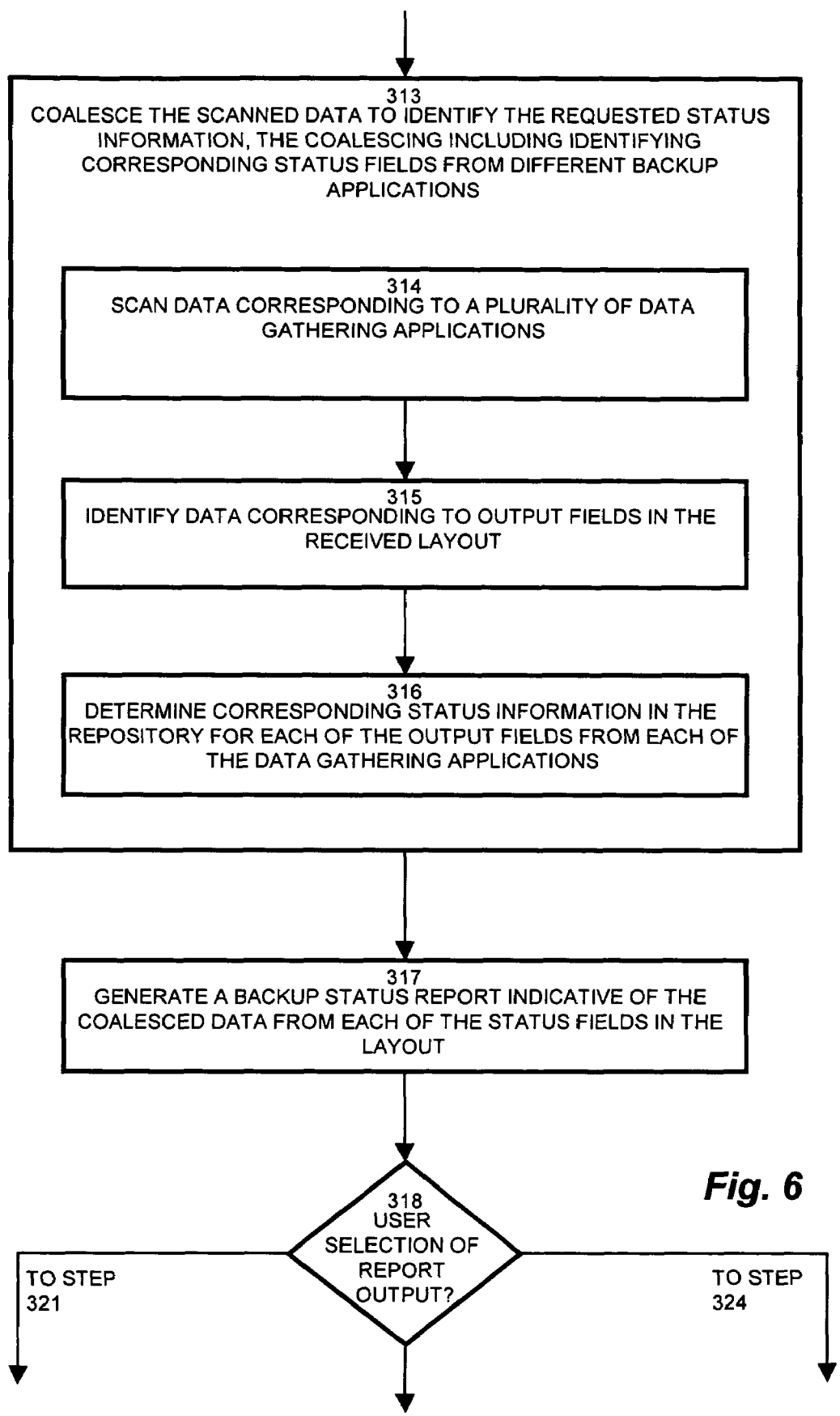
Figure 7:
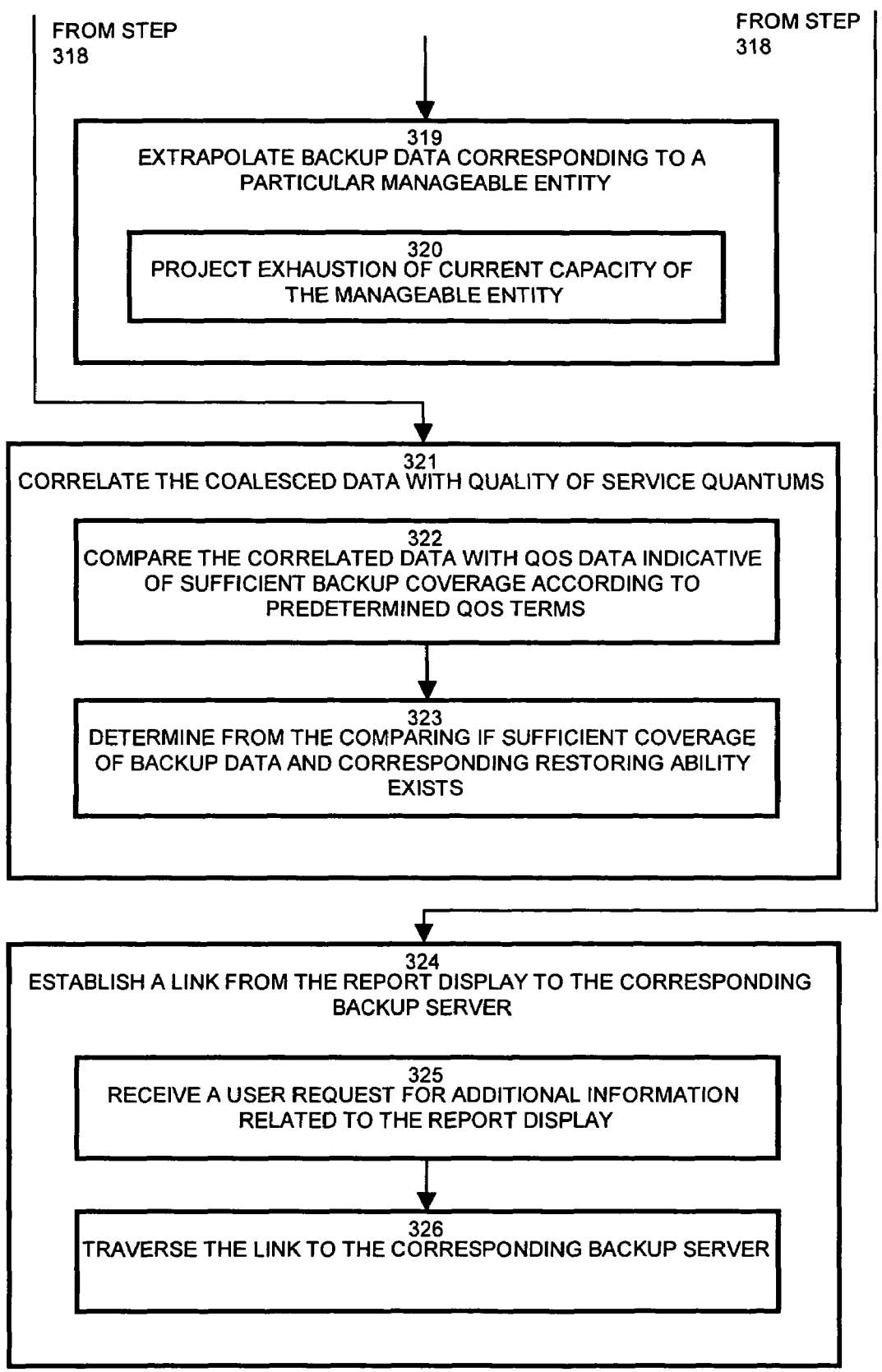

FIG. 2 is a flowchart illustrating backup reporting on the backup server of FIG. 1. FIG. 3 shows the backup server of FIG. 1 in greater detail. Referring to FIGS. 2 and 3, the backup management application 122 integrates and coordinates a plurality of responsive backup applications 124-1. In the exemplary configuration, each of the backup applications 124-1 . . . 124-N (124 generally) employs an application programming interface (API) 126-1 . . . 126-N (126 generally) accessible to the backup management application 122 for issuing calls (i.e. commands) and receiving requested data. Alternate mechanisms of software integration may be employed by particular configurations. Generally, each backup application is operable with one or more storage arrays 112 of a particular type or vendor. Typically, each storage array vendor defines a dedicated backup application 124 for use with storage arrays 112 of that vendor and/or type of storage array 112. Therefore, the backup management application 122 identifies and coordinates calls into each respective API 126 to obtain the requested data for a particular backup report 134.

The method of reporting backup operational status in a storage area network 110 of FIG. 3 according to the present claims includes gathering status information from a plurality of backup applications on one or more backup servers 120, or applications 124, and storing into a common repository 140 as depicted at step 200. Responsive to a user GUI request, the backup management application 122 receives a layout selection 132 indicative of requested status information, as shown at step 201. The layout selection 132 indicates the type and format of the fields requested for output as the backup report 134. In response, the backup management application 122 scans the backup data 144 in the common repository 140 for status data corresponding to requested backup reports 134, as depicted at step 202. The backup management application 122 coalesces the scanned backup data 144 to identify the requested status information, in which coalescing includes identifying corresponding status fields from the different backup applications 124 from which information is sought, as shown at step 203. The backup applications 124 of different vendors employ different APIs and different fields, however generally corresponding to common aspects of backup, such as successful identification of all files, media volumes, and other fields. Coalescing, therefore, involves integrating the different fields emanating from the different backup applications 124 to identify corresponding fields or values for inclusion in the backup report 134. Accordingly, the backup management application 122 generates a backup status report 134 indicative of the coalesced data from each of the status fields specified in the user selected layout 132 from among the available layouts 142, as depicted at step 204.

In the exemplary configuration in FIG. 3, the backup management application 122 retrieves and stores the backup data as raw backup data 144 in the repository 140. The raw backup data 144 may be stored, for example, as a markup file such as an XML file, operable for successive parsing and data retrieval. As the respective backup applications 124 perform backup operations, the repository 140 accumulates the backup data 144. In particular, the raw backup data may be gathered as a series or set, or reports, including data pertaining to servers, clients, data sets, job details, job errors, and schedule. Other arrangements and reports may be employed. Responsive to a user request for a backup report, the backup management application 122 receives a backup report/layout selection 132 via a GUI report display 136 from the console 130. The backup report/layout selection 132 is indicative of a set of layouts 142-1 . . . 142-N (142 generally) stored in the repository 140. The layouts 142 are indicative of the type and format of the data requested in the selection 132, and identify the corresponding backup data 144 reports and fields for retrieval and report display 136, as discussed further below.

FIGS. 4-7 are a flowchart of backup server processing in FIG. 2 in greater detail. Referring to FIGS. 3-7, at step 300, gathering the status information from a plurality of backup applications on a backup server into a common repository further includes interrogating the backup application 124 executing on each of the plurality of backup servers 120, in which each of the backup applications is independent of the other backup applications 124, as depicted at step 301. The backup applications 124, depending on the configuration, may be executing on multiple servers, or hosts (not specifically shown) throughput the SAN 110. The backup management application 122 nonetheless oversees gathering the backup data 144 from the backup applications 124 from the applicable SAN nodes executing the applications 124. The backup management application 122 retrieves and stores backup status parameters as backup data 144, in which the backup status parameters include the status information, as disclosed at step 302. The backup status parameters, in the exemplary configuration, include a plurality of sets of backup data, in which each of the sets includes backup status parameters corresponding to a particular report, as depicted at step 303. As indicated above, the reports further include at least one of server data, client data, data sets, job details, schedule and job errors. Each of the backup applications 124 corresponds to a different storage array 112 vendor, in which each of the vendors has a set of status parameters independent of the status parameters corresponding to other vendors, as encapsulated in the corresponding API 126, shown at step 304. The backup management application 122, therefore, inherits or includes the API 126 of each backup application 124 which it oversees, and maintains an indication of corresponding or equivalent field labels as common denominators between the various backup applications 124.

The backup management application 122 receives the selected layout 142, from the repository 140, indicative of requested status information, as depicted at step 305, responsively to the user selection 132. Further, the user may indicate a filter, in which the layout 142 is indicative of the filter selection, the filtering operable to selectively include a subset of available fields, as disclosed at step 306. Filtering, therefore, allows specification of a subset of available fields, and may be augmented with conditional statements such as range and match values on the selected fields.

The backup management application 122 then scans the common repository 140 for status data, or backup data 144, corresponding to requested status report 132, as depicted at step 307. In the exemplary arrangement, the raw backup data 144 is stored as six sets of XML report data, corresponding to the types of raw backup data enumerated above. The XML report files may be parsed and queried according to the XML markup syntax. Alternatively, other storage formats and parsing mechanisms may be employed.

In particular, the management application 122 distinguishes status indicative of substandard performance of the executed backup, such as status values of error or warning, as indicated at step 308. A check is performed, at step 309, to determine of status corresponding to substandard performance is found. If substandard performance is found, then the backup management application 122 identifies the particular vendor type of the backup application 124 generating the substandard performance, as shown at step 310. The backup management application 122 maps the status value indicative of substandard performance to a diagnostic explanation of the cause of the substandard performance for presentation to the operator or user, as shown at step 311. The console 130 then displays the mapped diagnostic explanation to a user on the report display 136, as disclosed at step 312. Alternatively, the mapped explanation may be displayed along other fields in the backup report 134 depending on the selected layout 132. In either case, executing continues at step 313.

The backup management application 122 coalesces the scanned data to identify the requested status information, in which coalescing includes identifying corresponding status fields from different backup applications 124, as shown at step 313. Coalescing typically includes scanning data corresponding to a plurality of data gathering applications, i.e. the backup applications 124 performing the backup and generating the raw backup data 144, as disclosed at step 314. Based on the selected layout 132, the backup management application 122 identifies data corresponding to the output fields in the received layout 142, as depicted at step 315, and determines corresponding status information in the repository 140 for each of the output fields from each of the data gathering backup applications 124, as disclosed at step 316. Therefore, the backup management application 122 identifies corresponding fields across each of the backup applications 124, from the stored backup data 144, and retrieves the requested fields by parsing the repository 140 XML files including the requested backup data 144. The backup management application 122 then generates a backup report 134 indicative of the coalesced data from each of the status fields in the layout 142, as depicted at step 317. The backup report 134 typically takes the form of an HTML file for display on the report display 136 via the console 130 GUI, but may also be alternate output forms such as text files, PDF files or any suitable output medium.

In addition to selecting the layout 142 indicative of the desired output, the method for reporting backup operational status also includes a user selection of output analysis, which may be either automated or manual correlation of the backup report 134. The method includes receiving user selection of further analysis of report output, as depicted at step 318. Responsive to the user input, the backup management application 122 may extrapolate backup data corresponding to a particular manageable entity, such as a storage array 112, as depicted at step 319. Extrapolation in this manner projects exhaustion of the current capacity of the manageable entity, such as storage array devices 114 therein, as disclosed at step 320. A SAN manager may find such analysis useful for projecting growth over time for particular projects and/or groups, for example, as an aid in recommending or deferring acquisition of new equipment.

The backup report 134 may be employed to correlate the coalesced data with quality of service quantums, as shown at step 321. Often, a backup service provider may associate service levels with backups. Such quality of service (QOS) provisions may specify, for example, maximum time requirements for fulfilling a retrieval request, or maximum time limits for completing a full or incremental backup (i.e. between midnight and 6 AM). Accordingly, the backup management application 122 compares the correlated data with QOS data indicative of sufficient backup coverage according to predetermined QOS terms, as depicted at step 322. Such QOS verification therefore determines from the comparing if sufficient coverage of backup data and corresponding restoring ability exists, as disclosed at step 323.

In alternate arrangements, a "hot link" is provided to the native backup application 124 for further refinement and/or querying of backup operations. The backup management application 122 establishes a link from the report display to the corresponding backup server or application 124, as depicted at step 324. Such a link, in the exemplary configuration, takes the form of a browser hot link, appearing as an underlined screen label to the corresponding host or backup application 124, discussed further below in the report display screen examples. The link provides further information about a specific backup application, and may be performed via a browser to a remote node, an interprocess communication mechanism, or a local redirection to a set of salient data. Accordingly, at step 325, the backup management application 122 receives a user request for additional information related to the report display 136, as depicted at step 325, thus allowing the user to traverse the link to the corresponding backup server, as disclosed at step 326 and shown further below with respect to exemplary report displays 136.

FIG. 8 shows an exemplary report of backup clients 150-1. Referring to FIG. 1, the report display 136 including the report 150-1 displays the fields site name 152-1, the name of the backup server host 152-2, the number of configuration items 152-3, the client host name 152-4 and the number of data sets 152-5. The report fields 152-N correspond to the layout 142, which may be predetermined or user defined. An exemplary backup server host LOSBD167 is shown by dotted line 120', and corresponds to an exemplary client host losbd203, shown by dotted line 112', which is a host serving a particular storage array. The exemplary storage array 112 host includes five data sets, shown by dotted line 156.

FIG. 9 shows an exemplary report of a backup schedule 150-2. Referring to FIGS. 8 and 9, the backup schedule includes the fields site name 152-1, backup server host name 152-2, configuration item name 152-6, schedule name 152-7, client host name 152-4, the data set name 152-8, and a start time 152-9. The exemplary client host losbd203 112', as indicated above, includes five data sets, shown by dotted line 156. Each of the five data sets 156 refers to a particular file specification, which may include all or a portion of a storage array device 114, shown by dotted line 114'.

FIG. 10 shows an exemplary report of backup data sets. Continuing from above with respect to FIG. 9, FIG. 10 shows a backup data set report 150-3 which also displays the data set names 156, such as individual storage array devices 114' and/or directory structures, on a particular storage array i.e. client host, shown by dotted line 112'. FIG. 10 also illustrates a hot link 158 to the corresponding backup server 120. FIG. 11 shows an exemplary display from the link to backup server 120 host LOSBD 167 from the hot link 158 of FIG. 10. Note that the links 158 are operative between backup applications 124 and/or backup client e.g. storage arrays 112 and backup servers 120. FIG. 11 illustrates, inter alia, the accessible devices 114' in addition to pertinent SAN info of the backup server 120.

The disclosed method for reporting backup operational status herein may encompass a variety of alternate deployment environments. In a particular configuration, as indicated above, the exemplary SAN management application discussed may be the EMC Control Center (ECC) application, marketed commercially by EMC Corporation of Hopkinton, Mass., assignee of the present application.

Those skilled in the art should readily appreciate that the programs and methods for reporting backup operational status as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for reporting backup operational status has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of reporting backup operational status integrated from heterogeneous backup applications in a storage area network comprising:
   identifying a plurality of heterogeneous backup applications, each of the heterogeneous backup applications having an application programming interface (API), and wherein each of the heterogeneous backup applications corresponds to one of a plurality of different vendors, each of the different vendors having a set of status parameters independent of status parameters corresponding to other vendors, the identifying further comprising:
      distinguishing a status indicative of substandard performance;
      identifying a particular vendor type of an application generating the substandard performance;
      mapping the status indicative of substandard performance to a diagnostic explanation of a cause of the substandard performance; and
      displaying the mapped diagnostic explanation of the cause of the substandard performance to a user;
   inheriting the API of each backup application;
   maintaining an indication of corresponding field labels as common denominators between the heterogeneous backup applications;
   using the inherited API of each of the heterogeneous backup applications, to gather, from the heterogeneous backup applications, a plurality of backup reports in a common markup format;
   receiving a layout corresponding to a user requested output report, the received layout indicative of output fields and filtering on the user requested output report;
   parsing each of the plurality of backup reports according to the common markup format, the parsing identifying corresponding fields from the plurality of backup reports generated from the heterogeneous backup applications;
   coalescing the identified corresponding fields from the plurality of backup reports into the user requested output report according to the received layout and displaying the user requested output report after coalescing, wherein the identified corresponding fields from the plurality of backup reports indicative of similar data items gathered from different heterogeneous backup applications, the coalescing further including:
      parsing backup data in a backup data repository to retrieve corresponding status fields in the backup data across the different heterogeneous backup applications, the corresponding status fields indicative of fields in the backup data satisfying common output fields in the received layout of the user requested output report;

integrating the corresponding status fields from the different heterogeneous backup applications for inclusion in the user requested output report, where a same specified field in the received layout is populated by the corresponding status fields from the different heterogeneous backup applications; and displaying the coalesced identified corresponding fields from the plurality of backup reports in the user requested output report as an integrated set of identified corresponding fields based on the received layout;

linking a console graphical user interface (GUI) from the displayed user requested output report to a corresponding backup management application, the console GUI receiving a user request for additional information related to the displayed user requested output report, wherein the console GUI traverses to the corresponding backup management application, the corresponding backup management application further comprising quality of service criteria indicative of quality of service quantums data, the corresponding backup management application further configured to:

correlate the coalesced identified corresponding fields from the plurality of backup reports with the quality of service quantums data;

compare the correlated coalesced identified corresponding fields from the plurality of backup reports with quality of service quantums data indicative of sufficient backup coverage according to predetermined quality of service terms; and determine from the comparing if sufficient backup coverage and corresponding restoring ability exists, wherein the corresponding backup management application is further configured to:

extrapolate backup capacity corresponding to a particular manageable entity; and project exhaustion of the capacity of the particular manageable entity.

2. The method of claim 1 wherein the common markup format is an extensible markup language (XML) and parsing further comprises identifying tags and corresponding data items, the tags indicative of a type of data according to a predetermined syntax.

* * * * *